Nov. 24, 1936. C. L. SNYDER 2,062,148
AIRCRAFT
Filed May 27, 1935 2 Sheets-Sheet 1

INVENTOR.
CLOYD L. SNYDER
BY
ATTORNEYS.

Nov. 24, 1936. C. L. SNYDER 2,062,148
AIRCRAFT
Filed May 27, 1935 2 Sheets-Sheet 2
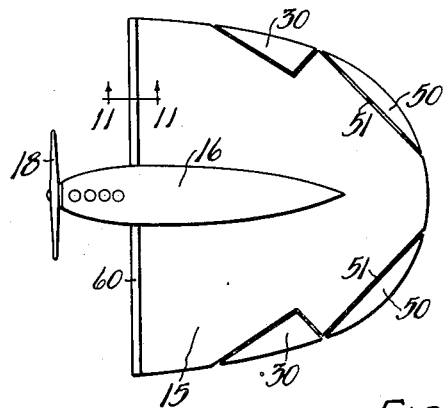
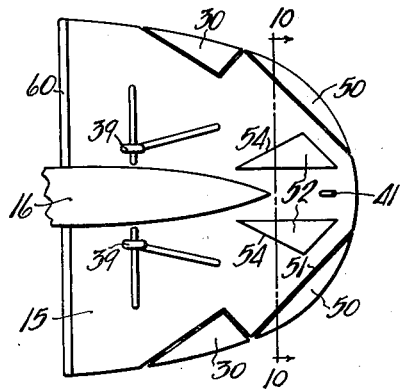
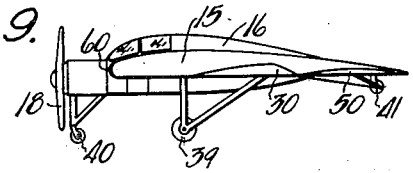
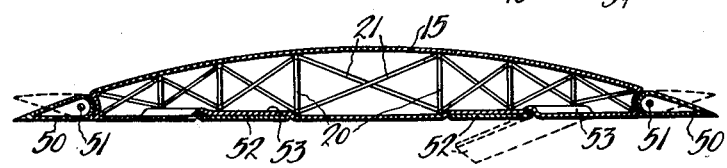
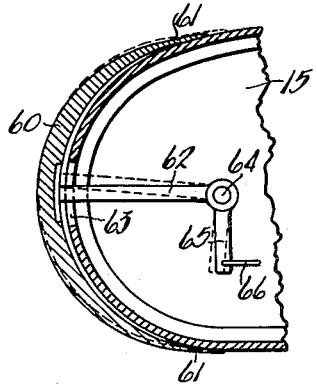
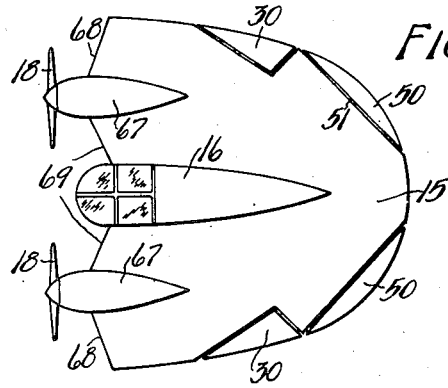
INVENTOR.
CLOYD L. SNYDER.
BY
*Altsch + Knoblock*
ATTORNEYS.

Patented Nov. 24, 1936

2,062,148

UNITED STATES PATENT OFFICE 2,062,148

AIRCRAFT

Cloyd L. Snyder, South Bend, Ind.

Application May 27, 1935, Serial No. 23,730

7 Claims. (Cl. 244—117)

This invention relates to aircraft, and particularly to aircraft utilizing an airfoil having a low aspect ratio.

The primary object of the invention is to provide an aircraft comparatively cheap in cost, strong and simple in construction, and having improved performance and safety characteristics.

A further object is to provide an aircraft having a novel airfoil construction and reinforcement.

A further object is to provide a novel passage for entrance into and exit from the aircraft.

A further object is to provide an aircraft of this character with novel directional control means.

A further object is to provide an aircraft of this character with a novel elevator construction.

A further object is to provide an aircraft having an airfoil with an adjustable leading edge for controlling the angle of attack of the airfoil.

A further object is to provide an aircraft of this character with a novel aileron construction.

A further object is to provide an aircraft of this character with a novel ground carriage.

Other objects will be apparent from the description and the appended claims.

In the drawings:

Figure 7 is a top plan view of another embodiment of my aircraft.

Figure 8 is a bottom plan view of the aircraft illustrated in Figure 7.

Figure 9 is a side elevation of the aircraft illustrated in Figure 7.

Figure 10 is a vertical transverse sectional view taken on line 10—10 of Figure 8.

Figure 11 is a fragmentary longitudinal sectional view taken on line 11—11 of Figure 7.

Figure 12 is a top plan view of a bi-motor aircraft.

Figure 1:
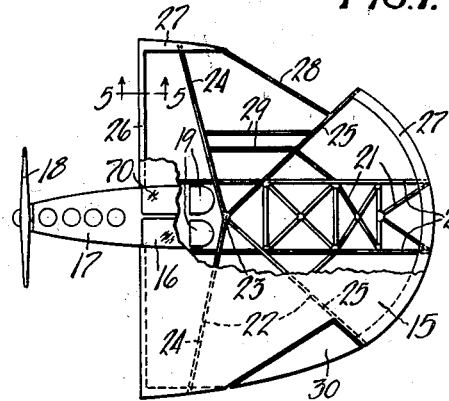
Figure 1 is a top plan view of the aircraft with parts of the framework exposed.

Referring to the drawings, and particularly to Figures 1 to 6, which illustrate one embodiment of my invention, the numeral 15 designates an airfoil of the same general type as illustrated in my Patent No. 1,855,695, dated April 26, 1932, wherein the leading edge is substantially straight transversely, and the trailing edge curves rearwardly inwardly from the ends of said leading edge, to provide an airfoil having a low aspect ratio and the same airfoil shape or section on all longitudinal section lines. A longitudinally extending cabin 16 projects above and below the airfoil at the transverse center thereof, said cabin being streamlined and merging with the airfoil at its rear end in forwardly spaced relation to the trailing edge. The front of the cabin projects forwardly of the airfoil and merges with the engine 17 which drives the propeller 18. The cockpit of the cabin is positioned rearwardly of and adjacent the leading edge of the airfoil and preferably provides two seats 19 in side by side relation. Windows 70 are provided in the cabin over and in front of the cockpit to provide good visibility for the pilot.

The framework of the aircraft preferably comprises a pair of spaced central longitudinally extending fabricated trusses or spars 20 which are cross braced throughout their length as illustrated at 21. A plurality of fabricated trusses or spars 22, preferably four for a small two-place craft as illustrated, are symmetrically arranged relative to the longitudinal axis of the craft, each extending angularly to said axis and to each other and converging at 23 rearwardly of the cockpit and substantially at the normal center of lift of the craft. In the construction illustrated, the two front spars 24 extend angularly forwardly from point 23, and the two rear spars 25 extend angularly rearwardly from point 23, all in balanced relation. The spars 22 are rigidly interconnected at their point 23 of convergence, and are also rigidly secured to the spars 20 at their intersections therewith. The marginal portions of the craft are all of rigid construction, the leading edge being provided with a rigid apron-like sheet metal structural member 26 of substantially U-shaped cross section, best shown in Figure 5, and the trailing edge being provided with a like rigid apron-like sheet metal structural member 27. The trailing edge structural member 27 is interrupted intermediate the ends of the spars 24 and 25 at each side thereof, and a spar 28 secured at its forward end to the rigid marginal frame member 27 adjacent the outer end of the forward spar 24 extends rearwardly inwardly therefrom and is secured at its rear end to the rear spar 25 in inwardly spaced relation to the end of said spar 25, for purposes to be hereinafter set forth. The spars 28 cooperate with the structural members 26 and 27 to provide a rigid marginal frame unit to which the outer ends of the spars 24 and 25 and 20 are secured, said spars triangulating said frame unit to render the same and the aircraft as a whole absolutely rigid and exceedingly strong. Supplementary spars (not shown) are used in spaced longitudinally extending relation to fill out the desired general shape of the airfoil and cabin and shape the covering of the same. The supplementary spars are rigidly secured to the spars 22 at their intersections therewith, and to the marginal frame unit at their ends, whereby they entirely eliminate the necessity for the usual brace or guy wires. Other supplementary structural members, such as 29, may also be fabricated in the assembly above described at points where special stresses occur, the member 29 serving to support and reinforce the structural unit at the point of connection of the landing gear therewith. Thus, though the body of the craft includes an airfoil and a cabin, the latter is merely a projection of the former, the whole being an integral or unitary construction, particularly in view of the extension of the cross spars 22 into the cabin and the rigid interconnection of said spars interiorly of the cabin. While the illustrated arrangement and number of spars 22 is preferred, particularly for small craft, it will be understood that in larger craft the number of spars may be increased, and that these spars may terminate at their connection with the spars 20, in which event spars 20 will be strongly cross braced, particularly at and adjacent the interconnection of spars 22 therewith, to give the same resultant strong and rigid X-frame construction.

The ailerons 30 of the aircraft are of substantially triangular outline, and fit into the recesses at the sides of the craft provided by the inset structural members 28. The ailerons are pivoted to the members 28 for vertical swinging movement, whereby their pivot axis is at an angle to the longitudinal axis and to the leading edge of the airfoil. Therefore the air stream impinging against the ailerons resolves into two components, the principal component effecting and controlling the lateral positioning or banking of the craft, and the other component assisting in directional control of the craft. In normal or inoperative position, the airfoils complete the airfoil section at the recesses, and the outer edges thereof complement and fill out the over-all plan outline of the airfoil.

The rear control assembly or empennage of the craft comprises a vertical fin 31 secured to the aircraft at the longitudinal center thereof immediately back of the cabin 16 and in forwardly spaced relation to the trailing edge. To this fin and in spaced relation above the airfoil are secured stabilizers 32 which project laterally from said fin. To the rear vertical edge of the fin is pivoted the rudder 33. Elevators 34 are pivoted to the rear edges of the stabilizers in laterally spaced relation to the rudder. Suitable reinforcing stay wires 35 serve to reinforce the fin and stabilizers, said wires preferably being secured to the respective parts by brackets 36, and the brackets carried by the airfoil preferably being secured to the upper chords of the central longitudinal spars 20. It will be understood, however, that the wires 35 may be eliminated from the structure by strengthening the fin and stabilizers and solidly supporting or reinforcing the same with respect to the framework of the craft.

The undercarriage or landing gear of the aircraft comprises the usual shock absorber and strut construction which is connected with the airfoil and particularly to members 29, and the same are housed in a depending streamlined housing 37 which is provided with an enlarged apron 38 at its lower end. Main supporting wheels 39 are positioned to normally project below the apron at the rear thereof, said wheels preferably being located at or slightly rearwardly of the center of weight of the aircraft. The wheels 39 are preferably provided with independently operable brakes. A supplementary landing wheel 40 normally projecting below the apron at the forward end thereof is mounted on a swivel and is positioned substantially forwardly of the center of weight of the aircraft. The usual rear ground strut or wheel 41 is positioned centrally of the aircraft adjacent the rear end thereof. If desired, the wheels 39 and 40 may be mounted for retraction into the apron 38 while the craft is in flight.

Figure 4:
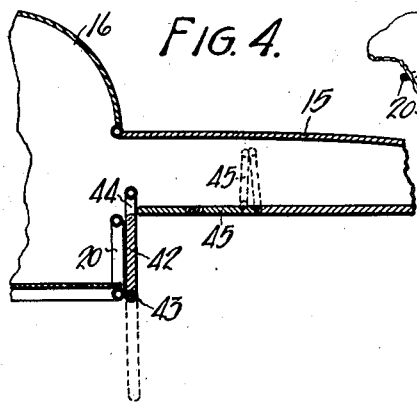
Figure 4 is a fragmentary vertical sectional view taken on line 4—4 of Figure 2 and illustrating the entrance passage construction.

The entrance passage to the aircraft is of novel construction, as best illustrated in Figure 4, and comprises a vertical door 42 in the side wall of cabin 16 below the airfoil and adjacent the cockpit. This door is pivoted at 43 at its lower edge, whereby it may swing vertically downwardly. A suitable stirrup 44 is carried by the free end of the door and serves as a step, as illustrated in dotted lines in Figure 2, when the door is open. A foldable two-part closure 45, normally forming a part of the lower enclosing surface of the airfoil, bears against the upper end of door 42 to lock the same in closed position. The closure 45 is folded upwardly within the airfoil, in the dotted line position illustrated in Figure 4, and the door 42 swung downwardly, to provide the entrance passage which is of a size large enough for convenient access into and exit from the cockpit.

This aircraft has been found in test to have excellent flight characteristics, and to be stable and instantly responsive to operation of the controls. The framework of the aircraft makes of its airfoil and cabin a unitary assembly of exceedingly sturdy and rigid construction, by virtue of its triangulated character. In flight, the craft is very stable and is not disturbed or rocked in flight by those small air pockets or eddies which usually disturb small two passenger conventional craft. Tests have also shown that this craft will not tail spin as the result of a stall, its action upon reaching a stalling position being an easy "settling" motion or levelling off to assume an even keel or normal flying condition. The craft is thus substantially self-righting, and has a much greater safety factor than conventional aircraft.

The aileron construction, by virtue of the rearward and inward angular disposition of its pivot edge with respect to the air stream impinging thereon, effects ready banking or lateral control of the craft; while at the same time utilizing the angular disposition of the pivot axis of the aileron to effect at least a measure of directional control which is directly complementary to the bank effected. In other words, for a left turn in direction of flight, with the left side of the airfoil lowered and the right side raised, the airstream acts upon the ailerons when positioned to effect such a bank in a manner to effect at least a measure of the left directional turn without manipulation of the rudder. It will also be noted that the pivoting of the ailerons to a structural member 28 forming a part of the reinforced structural marginal frame unit provides a solid and strong mounting therefor and in no way weakens the structure of the craft, despite the positioning of the ailerons within the over-all plan outline of the airfoil.

Figure 2:
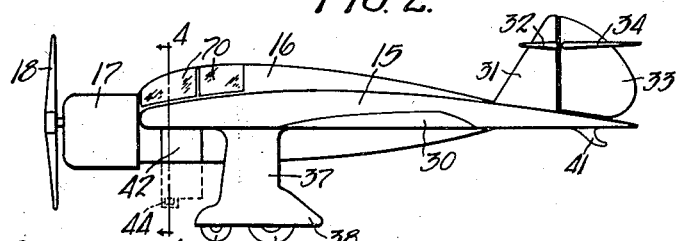
Figure 2 is a view of the aircraft in side elevation.
Figure 5:
Figure 5 is a fragmentary vertical sectional view of the leading edge of the airfoil taken on line 5—5 of Figure 1.
Figure 3:
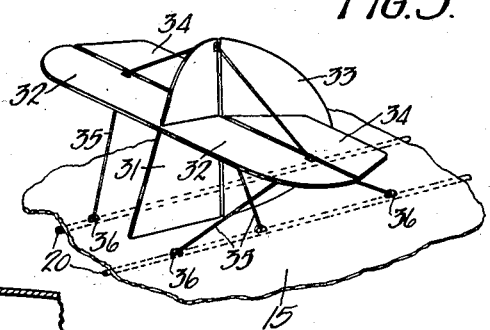
Figure 3 is a perspective view of the elevator, stabilizer and rudder assembly.

The landing gear or undercarriage of the craft, by correct positioning of the parts thereof, permits of novel handling and manipulation of the craft upon the ground. For take-off and landing, the craft is supported conventionally by the wheels 39 and ground strut 41. To taxi the craft into and out of hangars, to and from runways, and the like, however, the craft will ride upon the wheels 39 and 40 on an even keel as illustrated in Figure 2. The weight of the craft is entirely in balance in this latter position, so that the craft is stable; the craft thus being substantially a balanced lever wherein the wheels 39 serve as a fulcrum, and the lowering of the forward end of the craft serving to lengthen the forward lever arm, whereby the craft will maintain its level position supported by the wheels 39 and 40 without tendency to set back upon the ground strut. The swivel mounting of the wheel 40 renders the craft very easy to manipulate on the ground when the same is supported in part by said wheel 40. The provision of the wheel 40 also imparts an important factor of safety to the craft by preventing ground loops and the like.

Figure 6:
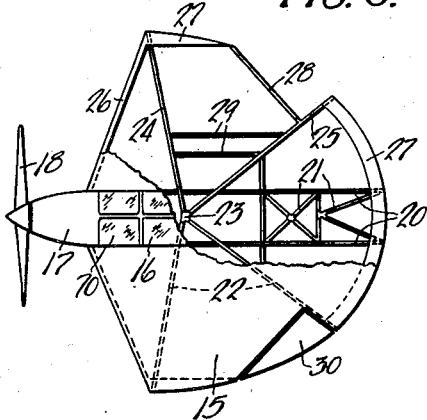
Figure 6 is a top plan view, with part of the framework exposed, of an aircraft having a modified airfoil.

The construction of the aircraft illustrated in Figure 6, is essentially the same as that above described, the only difference being in the sweep back whereby the ends of the leading edge of the airfoil in this construction are positioned rearwardly sufficiently to provide for securing of the outer ends of the forward spars 24 of the main cross braced or triangulated frame to the rigid marginal frame at the point of intersection of the leading and trailing edges of the airfoil, thus providing a true triangulation of the craft. It will be understood, of course, that the spars 24 may be positioned at an angle sufficient to provide for securing of their outer ends at the intersection of the leading and trailing edges of the airfoil in the construction illustrated in Figure 1.

Referring now to Figures 7 to 11, there is illustrated a further modified embodiment of a craft of this character wherein the empennage or projecting rear control assembly is entirely eliminated. In this embodiment, the general outline, construction and arrangement of the airfoil 15, cabin 16, ailerons 30 and the landing gear is the same as above described. The elevators 50 in this construction, like the ailerons 30, normally form parts or segments of the airfoil at the curved trailing edge thereof, and extend from adjacent the rear longitudinal center of the airfoil at each side thereof in balanced relation. The rear or inner ends of the elevators are spaced a substantial distance apart, and the elevators are pivoted on the chords 51 of the trailing edge. These elevators are operatively interconnected for simultaneous and equal elevation or depression in unison, or for different degrees of actuation in the same direction. Triangular members 52 are disposed adjacent the rear of the airfoil in balanced relation and equidistant from the longitudinal axis of the craft. These members 52 are received in recesses or insets 53 formed in the lower enclosing surface of the airfoil whereby they normally lie within and form a part of the airfoil. The members 52 are pivoted to the airfoil at their edges 54, which edges extend angularly rearwardly and outwardly with respect to the longitudinal axis of the craft. The members 52 are independently operable for downward pivotal movement into the airstream, and serve as rudders to control the direction of flight of the craft.

In flight, the elevators 50 serve with great efficiency for their purpose by virtue of the fact that when pivoted simultaneously in either direction, they concentrate the air stream and air pressure between them at the surface of the airfoil at the side toward which they are pivoted, while at the same time reducing the air pressure at the opposite side of the airfoil by reducing the effective length of the airfoil at that surface. Thus, for instance, when the elevators are raised, they act somewhat as a funnel, deflecting and concentrating the air stream centrally of the airfoil at the rear upper surface thereof, thus effectively lowering the rear end of the craft against the reduced air pressure at the lower surface of the foil to thereby place the craft in a climbing position. Reversal of the position of the elevators acts in the same effective manner to place the craft in diving position.

The rudders 52, by virtue of the rearward positioning thereof and the angular disposition of their pivot axis with respect to the longitudinal axis of the craft, are effective when individually operated to change the direction of travel of the craft. As important additional features, however, this rudder construction assists in or tends to bank the airfoil in proper relation for the desired turn, and to slightly elevate the rear portion of the airfoil during the turn. Both the banking and the slight nosing down of the craft in changing direction of flight conform to the well established practices of safe flying, so that by the use of this rudder the proper positioning of the craft to make a turn is rendered substantially automatic by operation of either rudder member. It will also been seen that the greater the depression of the rudder members and consequently the sharper the turn, the greater will be the components of force exerted against the particular rudder operated for the purpose of banking and nosing down the craft to take care of the turn. In other words, this rudder construction automatically compensates between the turning of the craft and the banking and nosing down thereof for any given degree of rudder operation. Another important feature of this rudder construction lies in the fact that these rudders being at the bottom of the craft, where the propeller blast is substantially undisturbed, give a maximum degree of efficiency.

Another novel feature involved in this embodiment of the invention is an adjustable leading edge airfoil construction, best illustrated in Figure 11. To the usual rounded leading edge or edges of the airfoil is applied an adjustable member 60 which extends the full length of the leading edge of the airfoil. This member 60 is of crescent or arcuate shape in cross section and its opposite side portions 61 are of reduced thickness and resilient for spring pressed face contacting engagement with the airfoil throughout the full length of the member 60. The member 60 is suitably supported by one or more normally horizontal arms 62 extending through suitable openings 63 in the leading edge of the airfoil, said arms being journalled on a transverse shaft 64 disposed substantially concentrically of member 60 and of the leading edge of the airfoil. Suitable operating means, as vertical arms 65 secured to the inner end of arm 63, and shaft 66 for pushing arm 65 forwardly or pulling it rearwardly, are provided for member 60. By actuating the operating means the member 60 is moved upwardly or downwardly on the leading edge, the resilient sides 61 both maintaining contacting engagement with the leading edge throughout their full extent in all positions the member 60 may assume. This construction thus permits of variation of the contour of the airfoil and particularly of the angle of attack of the leading edge of the airfoil on the airstream to provide adjustment to obtain maximum efficiency of the airfoil for any given flying condition. It will be particularly noted that the side portions 61 of member 60, by their thin tapering section and their resilient character, effectively seal the clearance between member 60 and the leading edge of the airfoil, whereby no drag or resistance due to eddy currents or the like is encountered in the use of the device. Also, the described construction of member 60 provides a fully streamlined airfoil in all adjustments of member 60.

In Figure 12 is illustrated a craft of this character powered by two motors 17 and two propellers 18. In this embodiment, the cabin 16 bears the same longitudinally central relation to airfoil 15 as in the previous forms, and the motors 17 are disposed in suitable streamlined housings 67 projecting forwardly of the airfoil in equi-spaced relation to the cabin. In this form, the leading edge of the airfoil is of irregular or substantially M-shape, the same being provided with a sweep back 68 from each motor housing to the adjacent wing tip and a sweep back 69 from each motor housing to the cabin. The same general over-all plan outline of the airfoil, with the curved trailing edge providing a low aspect ratio in the airfoil, is maintained in this embodiment.

Referring again to the construction of the aircraft body, and particularly to the provision of the airfoil and cabin with the X-spars 22, it is desired to point out that the same may form the only internal bracing and reinforcing members of the body. Thus, for instance, where the airfoil and cabin covering or enclosing members are formed of material having inherent rigidity, such as sheet metal of light weight, which can be rigidly secured to said cross spars 22 and to a rigid marginal structural frame 26, 27, supplementary airfoil shaping and supporting members are unnecessary, and the structure is obviously simplified and rendered less expensive to manufacture without sacrifice of strength or efficiency. Also, such a structure enables the stresses to be taken or sustained by the upper airfoil covering, whereby the airfoil is constructed of maximum strength.

I claim:

1. An aircraft comprising an airfoil of low aspect ratio having a leading edge and a trailing edge curving from end to end of said leading edge, a longitudinal cabin projecting vertically from the center of said airfoil, and means for reinforcing said airfoil and cabin comprising a rigid marginal airfoil frame, a central longitudinal spar structure secured at its ends to said frame, and a plurality of symmetrically arranged spars secured to said frame at the outer ends thereof and converging to the center of lift of the aircraft for rigid connection with said central spar and with each other.

2. An aircraft comprising an airfoil having a low aspect ratio, a rigid marginal supporting frame for said airfoil, a central longitudinal spar structure secured at its ends to said frame, and a plurality of spars arranged symmetrically relative to said central spar structure and each secured at its outer end to said frame, said last named spars converging to the center of lift of said airfoil for rigid interconnection with said central spar structure and with each other.

3. An aircraft having an airfoil of low aspect ratio, a rigid marginal supporting frame for said airfoil, a central longitudinal supporting structure secured at its ends to said frame, a pair of structural members extending laterally and rearwardly from the center of lift of said airfoil and secured at their outer ends to said frame, a pair of structural members extending laterally and forwardly from the center of lift and secured at their outer ends to said frame, said structural members being rigidly secured to each other and to said central structure.

4. An aircraft comprising an airfoil having a low aspect ratio, a longitudinal cabin positioned centrally of and projecting vertically from said airfoil, and means for reinforcing said aircraft comprising a rigid marginal frame for said airfoil, a pair of spaced longitudinal structural members extending adjacent the sides of said cabin, and secured at their ends to said frame, and a plurality of structural members arranged symmetrically to and extending angularly to said central structural members, said last named members being secured at their ends to said marginal frame and central members and being rigidly interconnected adjacent the center of lift of the airfoil.

5. An aircraft having an airfoil of low aspect ratio, a marginal rigid frame for said airfoil, a central longitudinal structural element secured at its ends of said frame, and a plurality of structural members arranged symmetrically to said element, said members being secured at their outer ends to said frame and converging and secured to said element adjacent the center of lift of said aircraft.

6. In an aircraft, an airfoil having a low aspect ratio and a curved trailing edge and comprising a central longitudinal reinforcing structure, a plurality of spars converging toward the center of lift of said aircraft and secured at their inner ends to said central structure, a rigid marginal airfoil frame secured to the outer ends of said central structure and spars, said frame being interrupted at opposite sides thereof adjacent complementary spars, a rearwardly inwardly directed structural member disposed in said interruption and secured at its forward end to said frame and at its rear end to said last named spar in spaced relation to the end thereof, and an aileron pivoted to each structural member and disposed in said interruption.

7. In an aircraft, an airfoil having a low aspect ratio and a progressively decreasing transverse dimension from front to rear and comprising a central longitudinal frame structure, an X-shaped frame structure secured to said central structure, a rigid marginal frame structure for said airfoil secured to the outer ends of said central and X-shaped structures, said marginal structure being interrupted at opposite sides thereof, a structural member defining said interruption secured at its forward end to said marginal structure and at its rear end to said X-shaped structure inwardly of said marginal structure, and ailerons complementing said airfoil and pivoted to said last named structural members.

CLOYD L. SNYDER.